G. LILJA.
CAR WHEEL.
APPLICATION FILED DEC. 26, 1913.
1,116,898.
Patented Nov. 10, 1914.
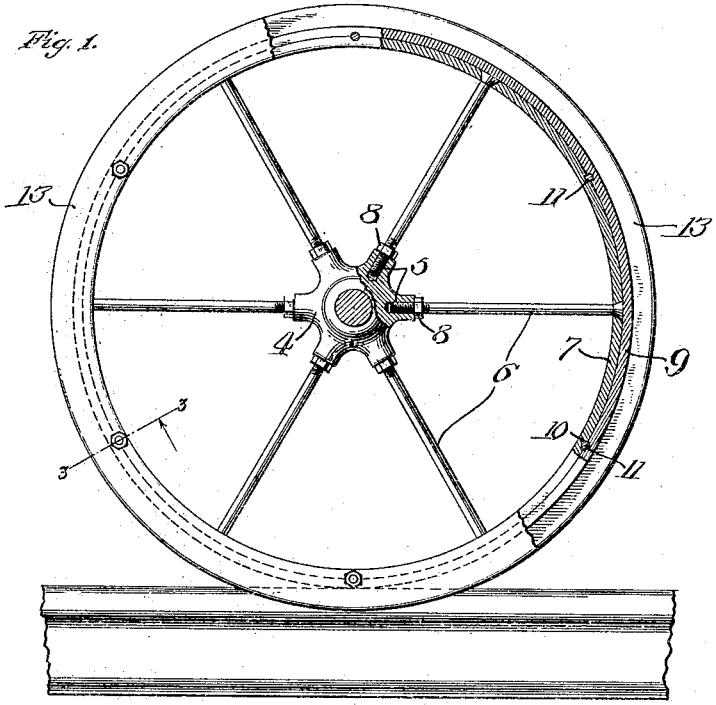
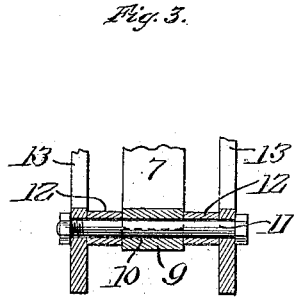
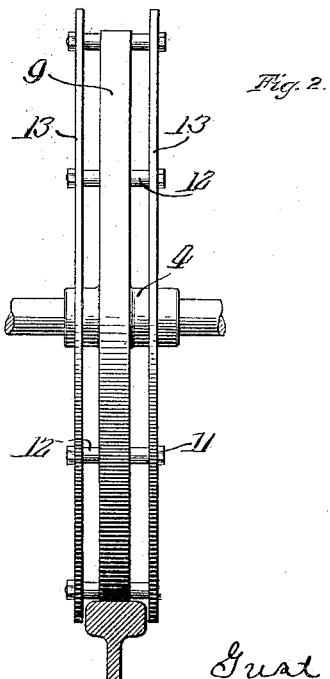
Witnesses:
Inventor:
Gust Lilja
By A O V Behel
Atty.

UNITED STATES PATENT OFFICE.

GUST LILJA, OF ROCKFORD, ILLINOIS.

CAR-WHEEL.

1,116,898.        Specification of Letters Patent.      Patented Nov. 10, 1914.

Application filed December 26, 1913. Serial No. 808,848.

*To all whom it may concern:*

Be it known that I, GUST LILJA, a citizen of the United States, residing at Rockford, in the county of Winnebago and the State of Illinois, have invented certain new and useful Improvements in Car-Wheels, of which the following is a specification.

This invention relates to wheels such as are used on light railway vehicles, and more particularly to those known as hand-cars.

The object of my invention is to provide an improved wheel that shall be light and simple in structure, and yet retain a thorough rigidity as to working strains, and effectiveness against frictional losses while in operation.

A further object is to provide a wheel with a three section construction including, a rim and separate flanges, and to provide a novel means of connecting same together.

In the accompanying drawings: Figure 1 is a side elevational view of my improved wheel, portions thereof being shown in section. Fig. 2 is an end view of the wheel. Fig. 3 is a detail sectional view as taken on the line 3—3 of Fig. 1, showing the manner of connecting the three wheel elements.

The hub 4 is of metal cast to shape and is formed with a plurality of spoke sockets 5 which are threaded to receive the screw-threaded ends of spokes 6, the spokes being of metallic rods. The outer ends of the spokes are formed with enlarged heads, and said outer ends extend through tapered apertures in an inner wheel-rim 7, so that when said spokes are inserted through the apertures of the wheel-rim and are screwed into the sockets of the hubs, the heads of the spokes will limit inward movement of the spokes relative to said wheel-rim, this construction allowing the spokes to be screwed tight into the hub to tension the wheel-rim and also to allow adjustment for centering same, whereupon the lock-nuts 8 on the screw-threaded end of the spokes would be tightened to hold the rim set with the hub. The said wheel-rim 7 is of a width narrower than that of a rail-face, and to strengthen said rim and protect and lock the spokes an outer wheel-rim 9 of equal face width as rim 7 is mounted upon the peripheral face of said rim 7. Bolt holes 10 are then drilled through the wheel-rims transversely and following their joint face, so that when bolts 11 are located therein in a substantially driving fit the two wheel-rims are secured relative to individual rotary movement by reason of the bolts being associated with both said rims. These bolts extend beyond each of the sides of the wheel-rims, and mounted upon each bolt extension is a collar or spacing abutment 12 which limits the spacing of annular ring flanges 13 that are mounted upon the extended ends of bolts 11 and are held securely upon said abutments by the drawing up tight of the screw-heads of said bolts. The flanges 13 of flat metallic structure have their peripheral portions extending beyond the rail-face of the wheel-rim, the flanges being so spaced apart that there is a good working clearance between their inner sides and the sides of the car-rail.

It will be observed that the spokes are locked from outward movement and are protected by the outer wheel-rim and are still capable of being adjusted for centering and tensioning purposes; also that the bolts 11 serve several purposes—to connect the two wheel-rims from relative displacement, provide mounting for the spacing abutments, and to provide mounting for the ring flanges. By the spacing of the flanges from the wheel-rim to obtain a reduced wheel-rim frictional resistances are reduced and the wheel structure made comparatively light, while still maintaining a rigid and well connected structure as has been above pointed out.

I claim as my invention:

1. A wheel comprising, a hub, spokes adjustably attached to the hub and having their outer ends headed, a wheel-rim having apertures through which the spokes extend, the apertures being adapted to receive said headed ends to limit inward movement of the spokes relative to said rim, an outer wheel-rim mounted upon the periphery of said spoke connected wheel-rim, an annular wheel-flange and means associated with and being located intermediate the joint faces of said wheel-rims for locking said wheel-rims from relative displacement and being connected to said wheel-flange.

2. A car-wheel comprising, a hub, spokes, a wheel-rim in connection with the spokes and having the width of its peripheral face less than the width of the face of a car-rail upon which it is adapted to roll, an annular ring flange for each side of the wheel-rim and each ring flange being spaced from the sides of said wheel-rim, and means for connecting said ring flanges to the wheel-rim.

3. A wheel comprising, a hub, spokes, an inner wheel-rim in connection with the spokes, an outer wheel-rim mounted upon the periphery of said inner wheel-rim, an annular rail-flange, and bolts extending through the joint face of said wheel-rims and being extended beyond a side of said rims to provide mounting for said flange.

4. A wheel comprising, a hub, spokes, an inner wheel-rim in connection with the spokes, an outer wheel-rim mounted upon the periphery of said inner wheel-rim, an annular rail-flange, and means associated with the joint face of said wheel-rims to lock same from individual rotary movement and said means providing support for mounting of said rail-flange.

5. A car-wheel having a flat faced rim the width of which rim face is less than the width of the face of a car-rail upon which it is adapted to roll, and an annular flange connected to the car-wheel and spaced from one side of its said peripheral face such a distance as to maintain said face substantially centrally on said car-rail.

In testimony whereof I have hereunto set my hand in presence of two subscribing witnesses.

GUST LILJA.

Witnesses:
C. ARTHUR NORDVALL,
CHARLES A. HILLNER.

Copies of this patent may be obtained for five cents each, by addressing the "Commissioner of Patents, Washington, D. C."